(12) United States Patent
McMillen et al.

(10) Patent No.: US 9,076,419 B2
(45) Date of Patent: Jul. 7, 2015

(54) MULTI-TOUCH PAD CONTROLLER

(71) Applicant: Kesumo LLC, Berkeley, CA (US)

(72) Inventors: Keith McMillen, Berkeley, CA (US); Daniel Eric McAnulty, Oakland, CA (US)

(73) Assignee: BeBop Sensors, Inc., Berkeley, CA (US)

( * ) Notice: Subject to any disclaimer, the term of this patent is extended or adjusted under 35 U.S.C. 154(b) by 268 days.

(21) Appl. No.: 13/799,304

(22) Filed: Mar. 13, 2013

(65) Prior Publication Data

US 2013/0239787 A1  Sep. 19, 2013

Related U.S. Application Data

(60) Provisional application No. 61/610,924, filed on Mar. 14, 2012.

(51) Int. Cl.
*G10H 3/14* (2006.01)
*G10H 1/02* (2006.01)
*G10H 1/00* (2006.01)
*G10H 1/055* (2006.01)

(52) U.S. Cl.
CPC ............. *G10H 1/02* (2013.01); *G10H 1/0008* (2013.01); *G10H 1/0556* (2013.01); *G10H 2220/061* (2013.01); *G10H 2220/096* (2013.01); *G10H 2230/015* (2013.01)

(58) Field of Classification Search
CPC ...... G10H 1/02; G10H 1/0008; G10H 1/0556
USPC ............................................ 84/734
See application file for complete search history.

(56) References Cited

U.S. PATENT DOCUMENTS

| | | | |
|---|---|---|---|
| 4,852,443 A | 8/1989 | Duncan et al. | |
| 5,131,306 A | 7/1992 | Yamamoto | |
| 5,288,938 A | 2/1994 | Wheaton | |
| 5,429,092 A | 7/1995 | Kamei | |
| 5,866,829 A | 2/1999 | Pecoraro | |
| 5,878,359 A | 3/1999 | Takeda | |
| 5,943,044 A * | 8/1999 | Martinelli et al. | 345/174 |
| 6,215,055 B1 | 4/2001 | Saravis | |
| 6,216,545 B1 | 4/2001 | Taylor | |
| 7,157,640 B2 | 1/2007 | Baggs | |
| 7,332,670 B2 | 2/2008 | Fujiwara et al. | |
| 7,608,776 B2 | 10/2009 | Ludwig | |
| 7,754,956 B2 | 7/2010 | Gain | |

(Continued)

FOREIGN PATENT DOCUMENTS

| | | |
|---|---|---|
| DE | 112010004038.9 | 10/2010 |
| JP | H08-194481 | 7/1996 |

(Continued)

OTHER PUBLICATIONS

International Search Report dated May 27, 2011, PCT Application No. PCT/US2010/052701.

(Continued)

*Primary Examiner* — Jianchun Qin
(74) *Attorney, Agent, or Firm* — Weaver Austin Villeneuve & Sampson LLP

(57) ABSTRACT

A highly configurable controller is described that includes a number of different types of control mechanisms that emulate a wide variety of conventional control mechanisms using pressure and location sensitive sensors that generate high-density control information which may be mapped to the controls of a wide variety of devices and software.

35 Claims, 15 Drawing Sheets

(56) References Cited

U.S. PATENT DOCUMENTS

| | | |
|---|---|---|
| 7,855,718 B2 | 12/2010 | Westerman |
| 7,928,312 B2 | 4/2011 | Sharma |
| 8,680,390 B2 | 3/2014 | McMillen et al. |
| 2007/0234888 A1 | 10/2007 | Rotolo de Moraes |
| 2008/0158145 A1 | 7/2008 | Westerman |
| 2008/0254824 A1 | 10/2008 | Moraes |
| 2009/0049980 A1 | 2/2009 | Sharma |
| 2009/0237374 A1 | 9/2009 | Li et al. |
| 2010/0315337 A1 | 12/2010 | Ferren et al. |
| 2011/0088535 A1 | 4/2011 | Zarimis |
| 2011/0088536 A1 | 4/2011 | McMillen |
| 2014/0222243 A1 | 8/2014 | McMillen et al. |

FOREIGN PATENT DOCUMENTS

| | | |
|---|---|---|
| JP | 2000-267664 A | 9/2000 |
| JP | 2008-515008 A | 5/2008 |
| WO | 2011/047171 | 4/2011 |

OTHER PUBLICATIONS

US Non-Final Office Action dated Sep. 12, 2012 issued for U.S. Appl. No. 12/904,657.

US Non-Final Office Action dated Apr. 15, 2013 issued for U.S. Appl. No. 12/904,657.

US Notice of Allowance dated Nov. 8, 2013 issued for U.S. Appl. No. 12/904,657.

U.S. Appl. No. 14/299,976, filed Jun. 9, 2014, McMillen.

U.S. Appl. No. 14/464,551, filed Aug. 20, 2014, McMillen.

U.S. Office Action dated Mar. 12, 2015 issued in U.S. Appl. No. 14/173,617.

PCT International Preliminary Report on Patentability and Written Opinion dated Apr. 26, 2012, issued in PCT/US2010/052701.

Japanese Office Action dated Feb. 25, 2014 issued in JP 2012-534361.

Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.

U.S. Appl. No. 14/671,821, filed Mar. 27, 2015, McMillen.

U.S. Appl. No. 14/671,844, filed Mar. 27, 2015, McMillen.

\* cited by examiner

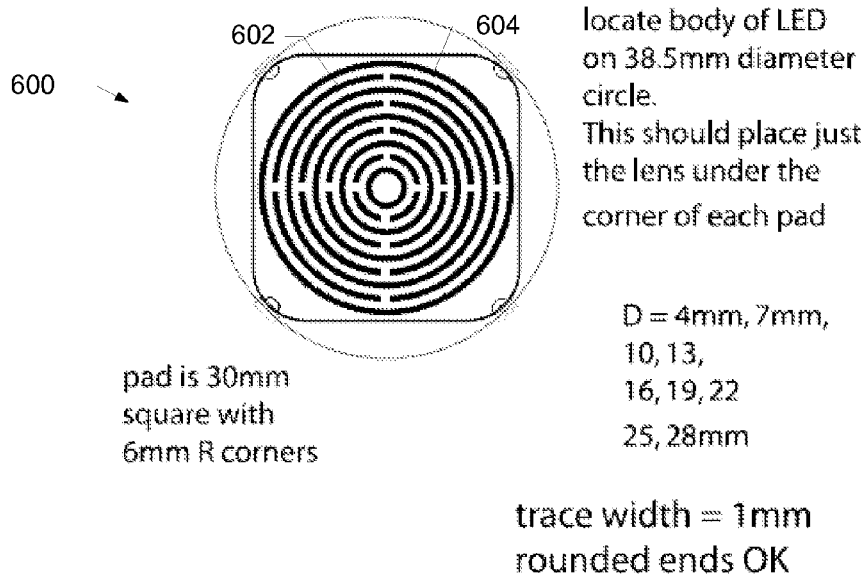

locate body of LED on 38.5mm diameter circle.
This should place just the lens under the corner of each pad pad is 30mm square with 6mm R corners D = 4mm, 7mm, 10, 13, 16, 19, 22, 25, 28mm trace width = 1mm
rounded ends OK

FIG. 6

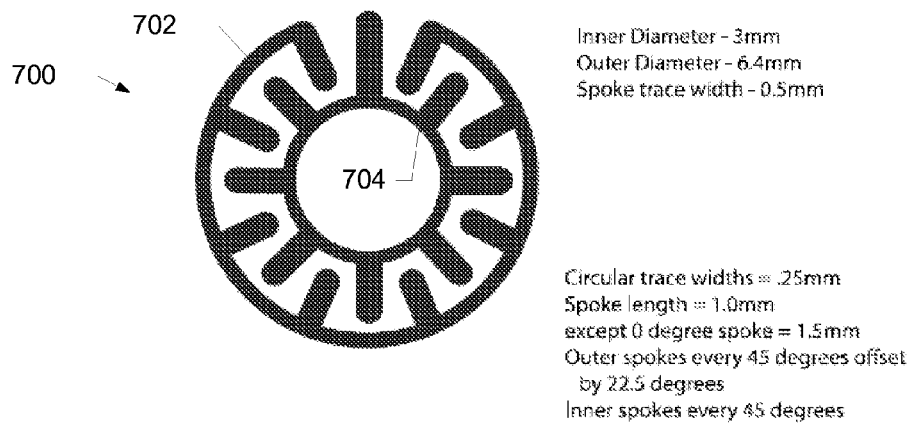

Inner Diameter - 3mm
Outer Diameter - 6.4mm
Spoke trace width - 0.5mm

Circular trace widths = .25mm
Spoke length = 1.0mm
except 0 degree spoke = 1.5mm
Outer spokes every 45 degrees offset by 22.5 degrees
Inner spokes every 45 degrees

MULTI-TOUCH PAD CONTROLLER

RELATED APPLICATION DATA

The present application claims priority under 35 U.S.C. 119(e) to U.S. Provisional Patent Application No. 61/610,924 for QuNeo 3D Multitouch Pad Controller filed on Mar. 14, 2012, the entire disclosure of which is incorporated herein by reference for all purposes.

BACKGROUND

There are a number of controllers used by musicians for triggering drum sounds, manipulating rhythmic beats, adjusting parameters and launching sample-based clips. Minimal user feedback is provided requiring the musician to look at a computer screen for information of the state of the sound producing software. Available controller devices have limited utility and are usually targeted at a specific type of data manipulation or work only with specific software. Typically these devices have used simple switches, variable knobs or slide potentiometers and trigger pads. These limitations require users to have multiple pieces of gear that produce a limited amount of control.

SUMMARY

According to a first class of implementations, a controller is provided that includes N control pads and one or more processors, where N is an integer greater than zero. Each control pad has sensor circuitry associated therewith configured to generate one or more sensor signals representing corresponding touch events on a corresponding surface of the control pad. The one or more sensor signals associated with each control pad also represent corresponding locations of the touch events on the surface of the control pad. The one or more processors are configured to generate control information from the sensor signals. In a first operational mode the one or more processors are configured to map the control information to N control functions. In a second operational mode the one or more processors are configured to map the control information to N×M control functions corresponding to the locations of the touch events on the surfaces of the N control pads, where M is an integer greater than one.

According to one such implementation, N is 16 and M is 4. The N control pads are arranged in a 4×4 array, and the locations of the touch events on the surfaces of the N control pads corresponding to the N×M control functions form an 8×8 control array. According to another such implementation, the first mode of operation corresponds to a drum pad controller, and the second mode of operation corresponds to a grid controller. According to another such implementation, the one or more sensor signals associated with each control pad also represent pressure of the touch events on the surface of the control pad, and the pressure of the touch events is reflected in the control information.

According to yet another such implementation, the sensor circuitry associated with each control pad includes four sensor quadrants. Each sensor quadrant includes first conductive elements connected to a first voltage reference and second conductive elements connected to a second voltage reference. At least some of the first and second conductive elements are connected to the corresponding voltage reference via a resistive element. The sensor circuitry also includes a conductive material configured to make contact with at least some of the first and second conductive elements in at least some of the sensor quadrants in response to the touch events, thereby forming one or more voltage dividers corresponding to the sensor quadrants with which contact is made. According to a specific implementation, the conductive material or at least some of the first and second conductive elements are or include a piezoresistive material. According to another specific implementation, the first and second conductive elements are arranged as concentric conductive traces across the four sensor quadrants, at least some of the concentric conductive traces being discontinuous, thereby defining the four sensor quadrants.

According to another class of implementations, a sensor is configured to generate one or more sensor signals representing corresponding touch events on a corresponding surface associated with the sensor. The sensor includes sensor circuitry that includes four sensor quadrants. Each sensor quadrant includes first conductive elements connected to a first voltage reference and second conductive elements connected to a second voltage reference. At least some of the first and second conductive elements are connected to the corresponding voltage reference via a resistive element. The sensor circuitry also includes a conductive material configured to make contact with at least some of the first and second conductive elements in at least some of the sensor quadrants in response to the touch events, thereby forming one or more voltage dividers corresponding to the sensor quadrants with which contact is made.

According to one such implementation, the conductive material or at least some of the first and second conductive elements are or include a piezoresistive material. According to another such implementation, the first and second conductive elements are arranged as concentric conductive traces across the four sensor quadrants. At least some of the concentric conductive traces are discontinuous, thereby defining the four sensor quadrants.

According to another such implementation, the one or more sensor signals represent pressure of the touch events on the surface of the sensor.

According to yet another such implementation, the one or more sensor signals represent corresponding locations of the touch events on the surface of the sensor. According to a more specific implementation, the touch events correspond to an object in contact with the surface of the sensor, and the one or more sensor signals also represent movement of the object across the surface of the sensor. According to an even more specific implementation, the one or more sensor signals also represent pressure of the touch events on the surface of the sensor, and the one or more sensor signals also represent wiggling of the object on the surface of the sensor.

According to another class of implementations, a sensor is configured to generate one or more sensor signals representing corresponding touch events on a corresponding surface associated with the sensor. The sensor comprising sensor circuitry that includes an arrangement of conductive elements. First one of the conductive elements are connected to a voltage reference, and second ones of the conductive elements are configured to receive sequential drive signals. At least some of the first and second conductive elements are connected to a resistive element. The sensor circuitry also includes a conductive material configured to make contact with at least some of the first and second conductive elements at locations associated with the touch events, thereby forming one or more voltage dividers when the second conductive elements with which contact by the conductive material is made are driven by a corresponding one of the sequential drive signals.

According to one such implementation, the conductive material or at least some of the first and second conductive elements are or include a piezoresistive material.

According to another such implementation, the one or more sensor signals represent corresponding locations of the touch events on the surface of the sensor. According to a more specific implementation, the one or more sensor signals represent the corresponding locations of multiple and simultaneous ones of the touch events on the surface of the sensor. According to another specific implementation, the touch events correspond to an object in contact with the surface of the sensor, and the one or more sensor signals also represent movement of the object across the surface of the sensor. According to an even more specific implementation, the one or more sensor signals also represent pressure of the touch events on the surface of the sensor, and wherein the one or more sensor signals also represent wiggling of the object on the surface of the sensor.

According to another such implementation, the one or more sensor signals represent pressure of the touch events on the surface of the sensor. According to a more specific implementation, the one or more sensor signals also represent corresponding locations of multiple and simultaneous ones of the touch events on the surface of the sensor.

According to yet another such implementation, the arrangement of the first and second conductive elements is an alternating arrangement of the first and second conductive elements. According to a more specific implementation, the alternating arrangement of the first and second conductive elements is either linear, circular, or rectilinear.

According to yet another such implementation, a control system includes at least one instance of the sensor, and one or more processors configured drive the second conductive elements with the sequential drive signals, to generate control information from the one or more sensor signals, and to map the control information to one or more control functions. According to a more specific implementation, the one or more sensor signals represent pressure of the touch events on the surface of the sensor, and a first one of the touch events corresponds to the conductive material making contact with more than one pair of the first and second conductive elements. The one or more processors are configured to generate the control information to represent a first location of the first touch event as corresponding to one of the pairs of the first and second conductive element with reference to the representation of the pressure of the first touch event in the one or more sensor signals. According to another specific implementation, the one or more sensor signals represent pressure of the touch events on the surface of the sensor, and the one or more sensor signals also represent corresponding locations of multiple and simultaneous ones of the touch events on the surface of the sensor. The one or more processors are configured to generate the control information to represent the pressure associated with each of the simultaneous touch events. According to another specific implementation, the one or more sensor signals represent corresponding locations and pressure of the touch events on the surface of the sensor, and the one or more processors are configured to map the control information to multiple control functions corresponding to different gestures. According to yet another specific implementation, the first and second conductive elements are each wedge-shaped and the arrangement of the first and second conductive elements is an alternating circular arrangement of the first and second conductive elements. The one or more processors are configured to generate the control information to represent a distance from a center of the circular arrangement based on a number of the conductive elements represented in the one or more sensor signals.

According to yet another class of implementations, computer program products and computer-implemented methods are provided for configuring a music controller to operate with one or more of a plurality of music applications from a plurality of different vendors. The plurality of music applications are presented as selectable options in a user interface of a computing device. One or more selections of the music applications are received. A location in memory of the computing device is identified for each selected music application. A plurality of script code files is stored in each location. Each script code file maps control information generated by the music controller to functions of the selected music application for the corresponding location. Each selected music application is configured to perform the functions in response to the control information from the controller using the script code files stored in the corresponding location in the memory of the computing device.

According to one such implementation, copies of the script code files are stored in one or more directories in the memory of the computing device separate from the locations for each of the selected music applications.

According to another such implementation, an example file for each selected music application is stored in the memory of the computing device. Each example file including code representing one or more sounds that may be generated using the corresponding selected music application in conjunction with the controller.

BRIEF DESCRIPTION OF THE DRAWINGS

FIG. 6-9 are diagrams of further implementations of sensors.

FIGS. 13-17 show examples of interfaces for facilitating configuration of a controller to interact with a variety of software applications.

A further understanding of the nature and advantages of various implementations may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Various implementations provide a highly configurable controller that includes a number of different types of control mechanisms that emulate a wide variety of conventional control mechanisms (e.g., buttons, sliders, pads, rotary controls, etc.) using pressure and location sensitive sensors that generate high-density control information which may be mapped to the controls of a wide variety of devices and software.

Figure 1:
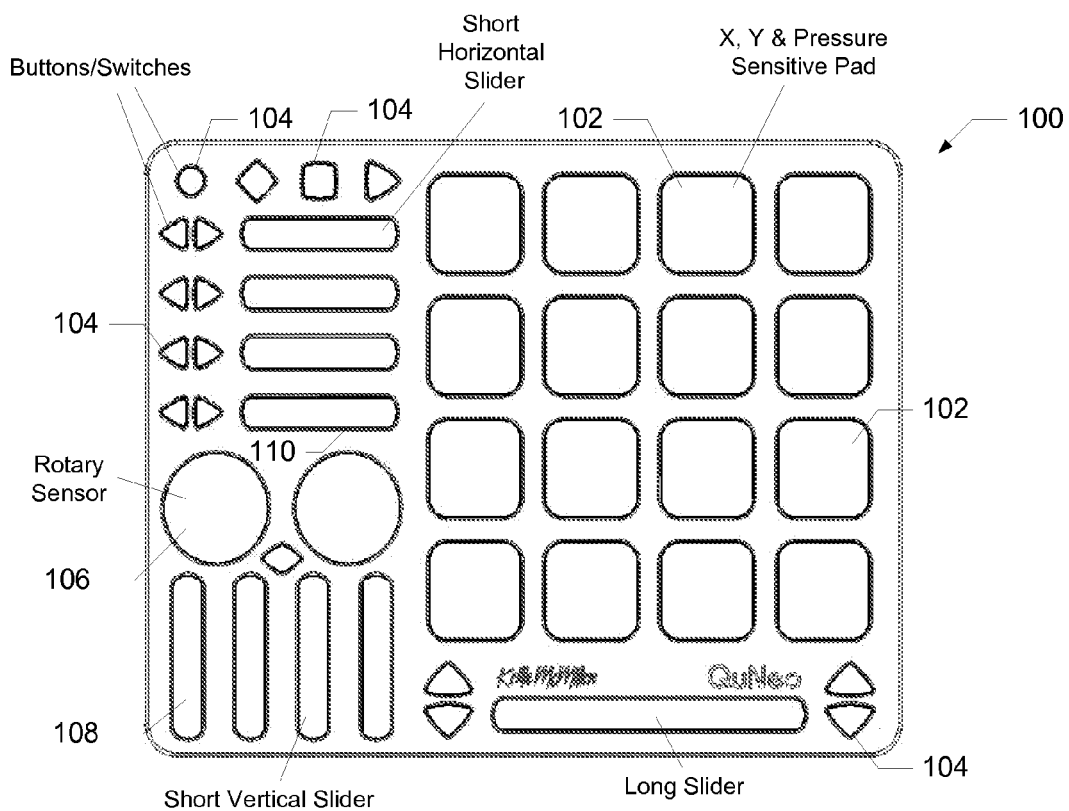
FIG. 1 is a top view of a particular implementation of a controller.

A particular implementation shown in FIG. 1 is embodied as a musical effects controller 100 and is referred to herein as QuNeo. QuNeo 100 provides a variety of sensors, at least some of which are responsive to X and Y (position) and Z (pressure), by which a user effects control over connected software or device(s). The depicted implementation includes pressure and position sensitive pads 102, buttons/switches 104, decks or rotary sensors 106 (e.g., to emulate spinning vinyl records), faders or sliders 108 or 110 (e.g., to emulate VU or loudness metering). Any of sensors 104, 106, 108 and 110 may also be sensitive to pressure. As will be discussed, each of the depicted sensors generates control information that may be mapped to control a wide variety of software and/or devices.

According to some implementations, pressure and position sensitive pads 102 can be used to elicit percussive sounds that vary in timbre based on where the user strikes the pad which is analogous to real acoustic percussion instruments. Faders 108 are analogous to volume level controls on traditional mixing boards. Buttons 104 can be used to make selections from lists presented by a computer menu and can scroll or navigate more rapidly through the list based on how firmly the button is pushed. A wide variety of other applications of the sensor capabilities and high density control information generated by controllers as implemented herein will be apparent to those of skill in the art.

Figure 2:
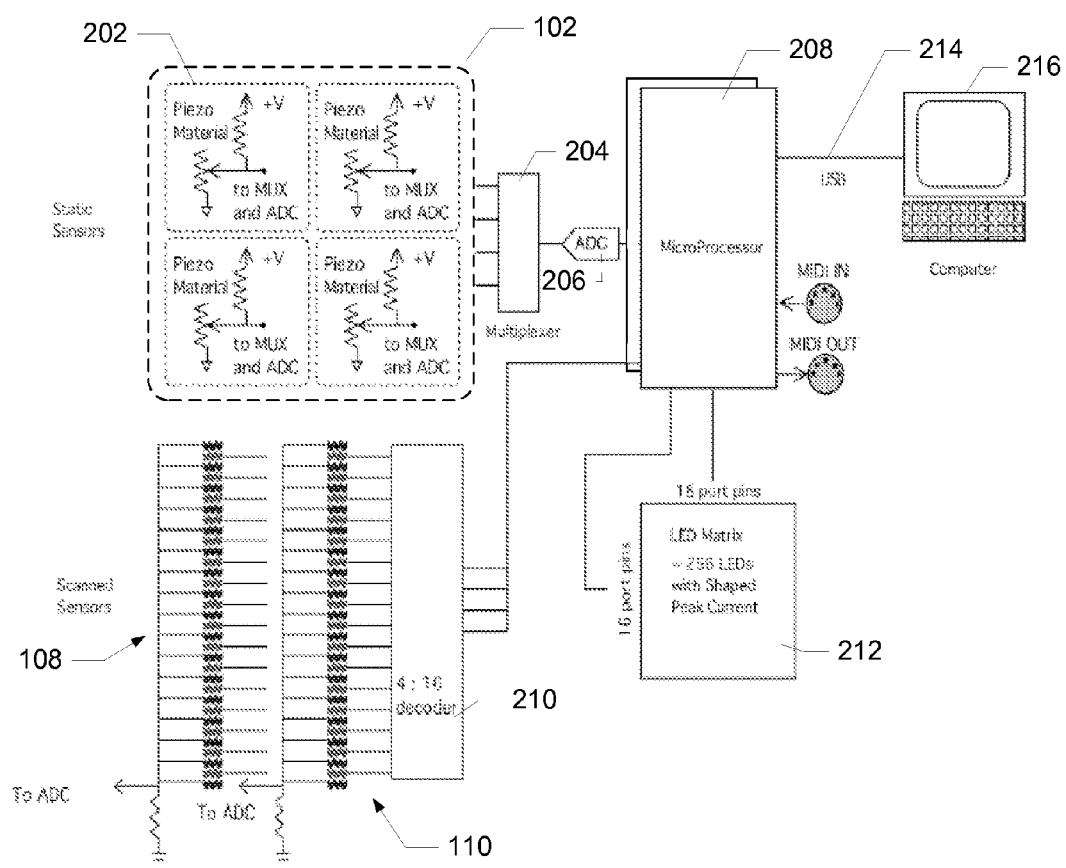
FIG. 2 is a simplified block diagram of a particular implementation of a controller.

FIG. 2 shows a simplified block diagram of the components of a controller such as, for example, QuNeo 100. In this diagram only some of the sensors are depicted for the sake of clarity. Pad 102 is shown to include four voltage dividers 202 implemented with piezoresistive material, each of which generates an output signal responsive to pressure exerted on pad 102 that is reflective of the changing characteristics of the respective voltage dividers. The signals are multiplexed (204) and converted to digital form (206) and then provided as input to one or more microprocessors 208.

Sliders 108 and 110, the operation of which is described below, are scanned or driven by microprocessor 208 via decoders, e.g., decoder 210 (only one of which is shown for clarity). The outputs of sliders 108 and 110 are then converted to digital form (not shown) for input to microprocessor 208. Other sensors, e.g., buttons 106 shown in FIG. 1, provide input to microprocessor 208 by similar connections. In this implementation, microprocessor 208 also controls an LED matrix 212 that underlies the translucent surfaces of the various sensors. A particular drive scheme for such an LED matrix is described below. Optional MIDI (Musical Instrument Digital Interface) input and MIDI output are provided by which microprocessor 208 may communicate with and control various MIDI-compliant devices. Control information generated from the various sensors may also be provided over a serial link (e.g., USB link 214) for the control of software (e.g., on computing device 216) or a connected device (not shown). The functionalities of QuNeo 100 may also be configured, programmed, or modified via USB link 214 by software residing on computing device 216. Alternatively, USB link 214 may be replaced by any suitable alternative including, for example, a wireless connection. Computing device 216 may be any of a wide variety of computing devices including, for example, a personal computer (e.g., a laptop or desktop), a mobile device (e.g., a cell phone, smart phone, or tablet), a set top box (e.g., for cable or satellite systems), a smart television, a gaming console, etc.

Figure 3:
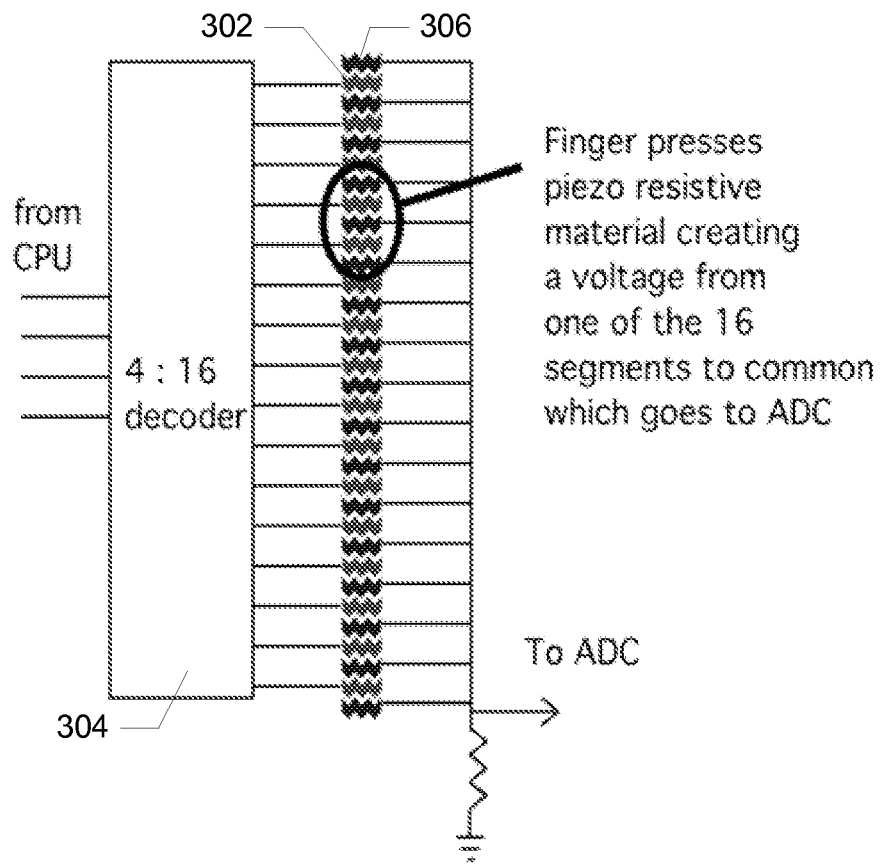
FIG. 3 is a diagram of a particular implementation of a sensor.

According to a particular class of implementations, a subset of the sensors (e.g., the sliders and rotary sensors) are implemented using an array of driven or scanned conductive printed circuit board (PCB) elements alternating with conductive elements connected to a voltage reference, e.g., ground, through a resistor. The array overlaid with a conductive pressure sensitive compressible material that may be a piezoresistive material such as, for example, germanium, polycrystalline silicon, amorphous silicon, non-woven impregnated fabric and single crystal silicon. FIG. 3 shows a configuration of a such a sensor in which the conductive elements are arranged in a linear array to form a slider. The microprocessor (not shown) sequentially selects and activates the driven elements (16 elements 302 are used in a particular implementation) via decoder 304 by raising its voltage to a known level (e.g., 3.3V). The other driven elements 302 are set to ground or 0 volts.

Figure 4A:
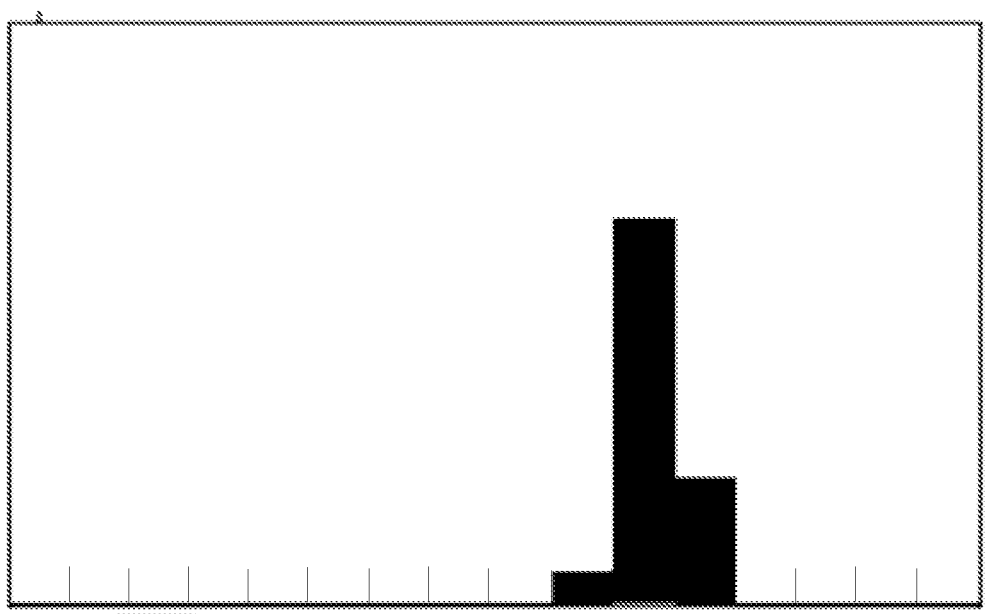
FIGS. 4A and 4B are bar graphs representing touch events on the sensor of FIG. 3.

The common elements 306 are tied to ground through a resistor. When pressure is applied by the user (e.g., using a finger or stylus) the driven element(s) 302 at the point of contact are connected to the surrounding common elements 306 by the overlying conductive material (not shown). The voltage at the junction of the common elements and the driven element(s) is thereby raised and transmitted via a multiplexer to an ADC (not shown). The microprocessor driving the driven elements (not shown) also sequentially measures the corresponding signal levels, e.g., the voltage at the junction of the driven element(s) and nearby common element(s), to determine whether and where a touch event occurs. The ADC output can be represented as shown in the bar graph of FIG. 4A in which the ADC output from the 16 driven elements is represented as bars along the horizontal axis.

According to implementations in which the overlying material that connects the sensor resistive elements is a piezoresistive material, processing of this data by the microprocessor yields both pressure information (e.g., the sum of all raised data points) and location information (e.g., the centroid of the data points). According to a particular class of implementations, the positional resolution derived from the array may be much greater than the number of elements, i.e., interpolation between the data values using a centroid calculation or similar method yields greater positional accuracy than simply using the locations of the array elements. For example, if the ADC converter that measures the voltages of 16 driven elements is 8 bits the positional resolution is theoretically 1 part in 256 for each of the 16 element locations, or 1 part in 4096 for the array using a simple interpolation approach.

Figure 4B:
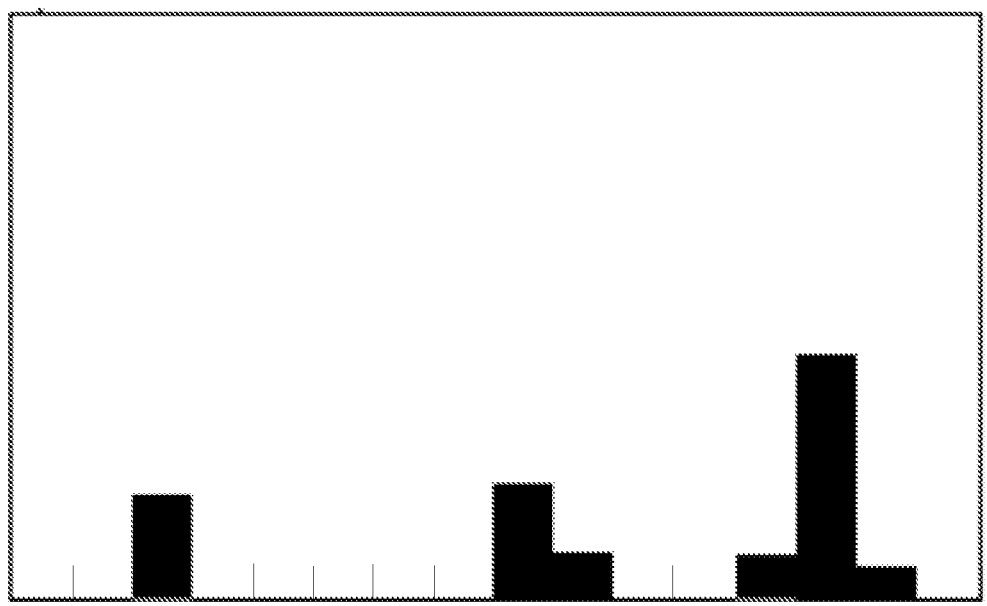

According to some implementations, driven/scanned sensors can be configured to recognize multiple touch points. The graph of FIG. 4B illustrates ADC values for three fingers exerting pressure on the linear array of elements at different locations. Height and number of element voltage values map directly to the pressure applied. In such configurations, user interface gestures such as pinch and stretch and multiple finger swipes can be extracted from the sensor array along with pressure for each of the contact points.

Various configurations of resistive elements are contemplated that yield information about different styles of human gesture. For example, if the elements are arranged in a linear array as shown in FIG. 3 a slider may be implemented. If the elements are arranged in a two-dimensional array (e.g., a circular or rectilinear array) information about motion in two-dimensions, e.g., rotary motion, can be extracted.

Figure 5A:
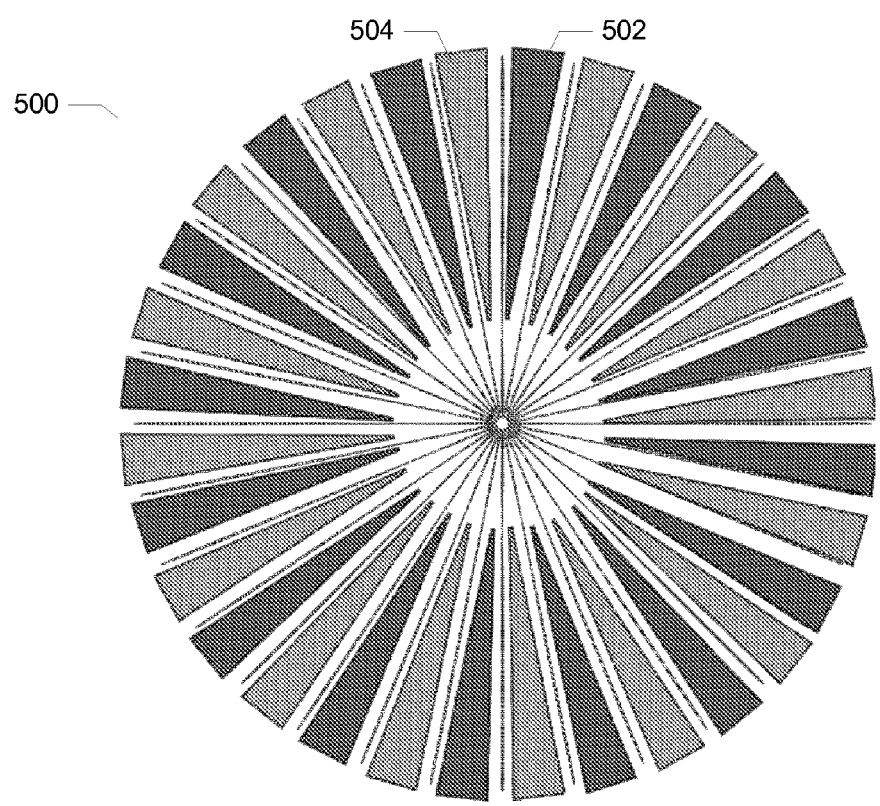
FIG. 5A is a diagram of another implementation of a sensor.

FIG. 5A shows an example of a two-dimensional array 500 of PCB conductive elements arranged in a circular pattern. In the depicted implementation, sixteen driven elements alternate with sixteen common elements. Apart from the shape and configuration of the conductive elements, the principle of operation of a sensor using array 500 is similar to the sensor described above with reference to FIG. 3, with the circuitry for driving and measuring signal levels (not shown) being substantially the same. As with the sensor of FIG. 3, each of the driven elements can be driven to an active voltage while the common elements are tied together and biased to a reference, e.g., ground, through a resistor. The entire circular area is covered with a compressible conductive and/or piezoresistive material. As the microprocessor reads the ADC values for each of the 16 driven elements, high-resolution rotational or angular position along with the pressure of the activating finger or object may be determined using, for example, interpolation techniques as mentioned above.

Figure 5B:
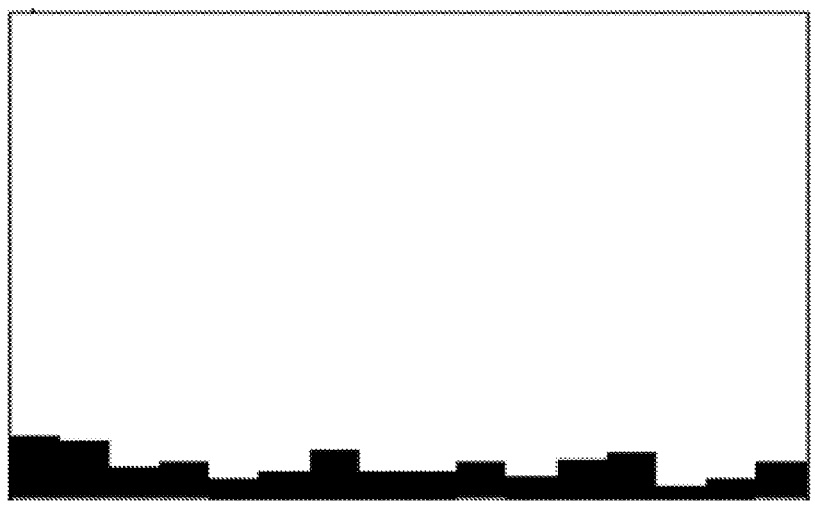
FIG. 5B is a bar graph representing a touch event on the sensor of FIG. 5A.

Analyzing the spread of data values using known statistical methods may provide information related to the location of the touch event with respect to the center of circular array 500. This can be expressed as the radius of the gesturing finger. According to a particular implementation, the radial "slices" converge in the center of the array to a radius approximating the size of the activating source, e.g., such as 4-5 mm for a human finger. In the bar graph of FIG. 5B, the ADC output for all of the driven elements shows some voltage associated with their activation. As these approach an equal amount from all radial elements the microprocessor can determine that the finger is in the center of the circular array. In addition, for implementations in which the overlying material is piezoresistive, the summed height or voltage of all elements is substantially proportional to pressure.

Another sensor that may be used with various implementations of a controller as described herein is illustrated in FIG. 6. In this implementation, a piezoresistive material (not shown) overlies an array 600 of concentric conductive traces, a subset of which are discontinuous and divided into four quadrants. As will be discussed, this arrangement is configured to provide both positional information (e.g., X and Y or in the plane of the page), as well as pressure information (e.g., Z or into the page) regarding a touch event. This arrangement of conductive traces may be used to implement, for example, sensor pads 102 shown in FIGS. 1 and 2.

Each of four quadrants of 90 degrees includes discontinuous conductive traces 602 spanning about 90 degrees of arc that are connected to each other and tied to a reference voltage through a resistor (e.g., 10K ohm) and to an ADC through a multiplexer (e.g., as shown in FIG. 2). Alternating with the discontinuous quadrant traces in the radial direction are continuous concentric traces 604 that are at some reference, e.g., ground or 0 Volts. The pattern of traces is covered with a compressible piezoresistive material (not shown).

As the user presses on a silicone pad that covers the piezoresistive material, the conductive trace of the four quadrants are connected to the reference voltage (via the piezoresistive material) to varying degrees. The location chosen by the user and the pressure exerted in that position can be determined by a microprocessor (e.g., 208) through a comparison and evaluation of the signal levels present in each of the quadrants. As will be understood, this arrangement can provide a very high density of control information that may be mapped to a wide variety of applications. For example, in addition to the control of musical effects, the control information generated using such a sensor may be used to control a cursor or pointer, or the depicted point of view, in the user interface of a computing device. In addition, as discussed below, this arrangement may also be flexibly configured to operate as a single sensor or as multiple sensors.

FIG. 7 shows an arrangement of conductive PCB traces for implementing another type of sensor that allows measurement of pressure at a specific point. Using this configuration, even simple switches, e.g., "On/Off" buttons, may be made pressure sensitive by use of a pattern of traces 700 covered with the piezoresistive material (not shown). One of traces 702 and 704 is pulled up to a reference while the other pull down to another reference. As the user's finger pressure compresses the piezoresistive material the resistance between the conductors 702 and 704 decreases and the voltage to the ADC changes correspondingly. Applications of such a sensor include, for example, pressure controlled scrolling rates when doing selection of items in a user interface, or pressure-sensitive control of musical parameters.

According to various implementations, the geometry, density, opacity and coating of an silicone layer overlying the sensors may be controlled to accomplish any subset of the following: (1) hold the piezoresistive material at a specified distance from the trace patterns; (2) deform evenly over the length, diameter or area of the specific sensor providing a linear and even response; (3) transfer the luminance from an LED indicator over the top of the sensor area; (4) diffuse the LED indicator light so it does not appear as a point; (5) protect the piezoresistive material, LED, trace and/or electronic components underneath; and/or (6) provide an appropriate tactile surface so the finger can slide or grip in a manner appropriate for how the specific sensor is activated.

Figure 8:
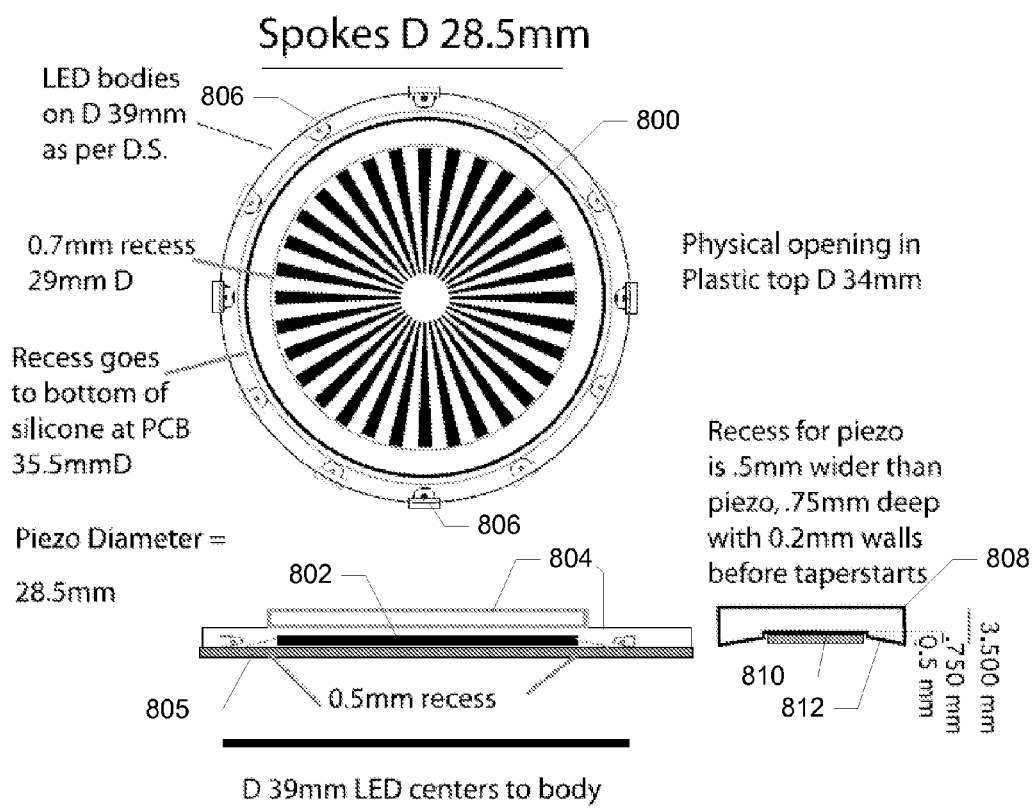

An example of the relationship of a silicone layer to an underlying sensor configuration is shown in FIG. 8. The sensor configuration is a circular array 800 of driven/scanned conductive elements, e.g., as discussed above with reference to FIG. 5A. Recessing the piezoresistive material 802 into the silicone layer 804 above the conductive elements on PCB 805 keeps the piezoresistive material 802 slightly off contact with the conductive elements (e.g., about 0.008") which creates a distinctive change in the values read by the ADC when the silicone layer above a given area of the sensor is touched. Increasing pressure on the silicone increases the readings of the ADC. Keeping the piezoresistive material close to the conductive elements with a sufficient silicone layer above the piezoresistive material facilitates transfer of the light from indicator LEDS 806 over the top of the conductive elements.

FIG. 8 also shows a cross-sectional view of a silicone layer 808 with piezoresistive material 810 in a recess in the underside of silicone layer 808. The view illustrates a taper 812 on either side of the piezoresistive material (also present in the cross-sectional view including elements 802 and 804) that allows silicone layer 808 to travel when compressed. It should be noted that this cross-section is not to scale, and may be illustrative of the relationships between the piezoresistive material and the silicone layer for any of the sensors of any of the implementations described herein.

According to a particular class of implementations, position and pressure information generated using appropriately configured sensors (such as those described herein and suitable alternatives) may be used to provide sophisticated types of control. For example, changes in position and/or pressure on a particular sensor may be used to modulate control information around one or more quantized states associated with the sensor. A particular example in the context of a musical effects controller is when a sensor is configured as a piano or synthesizer key. In such a case, changes in position and/or pressure, e.g., when the user wiggles or slides his finger back and forth, can be used to distort or modulate the pitch of the primary note associated with the key, e.g., to effect note bending or vibrato.

Figure 9:
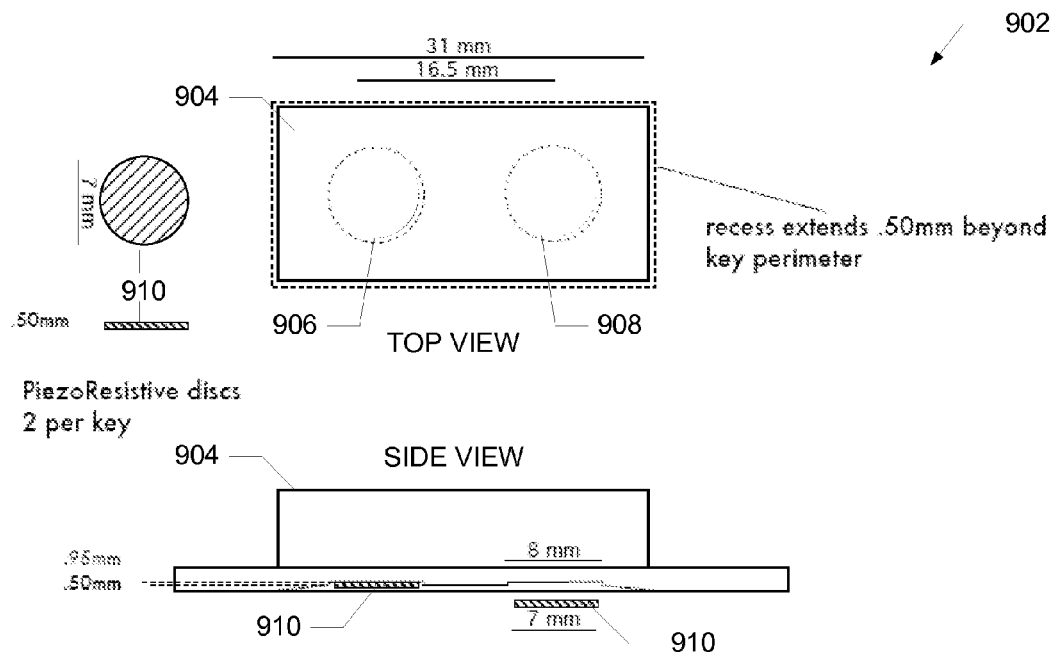

According to one such implementation illustrated in FIG. 9, a two-sector sensor 902 is implemented to have a top and a bottom sector of a key, e.g., the top and bottom halves each having a sensor implemented as described with reference to FIG. 6 or 7. The silicone keypad 904 has two recesses 906 and 908 in the underside of the keypad for holding piezoresistive elements, e.g., piezoresistive discs 910.

When the key is activated, e.g., by a touch event, one or both of the piezoresistive discs contact the underlying conductive elements of the sensor(s), and the control information is mapped to the primary quantized state associated with the key, i.e., the corresponding note is reproduced. An initial absolute value is generated representing the difference between the signal(s) generated by the top and bottom sensors. An offset is added to the initial absolute value to define an activation threshold. After a period of delay from when the key is first declared active, real-time absolute values calculated like the initial value are streamed from the key and compared to the activation threshold. If the activation threshold is exceeded, e.g., because the user is rocking the key back and forth by wiggling his finger, the microprocessor maps the correspondingly modulated control information received from the key (i.e., the pressure and/or position information) to the desired effect, e.g., note bending, vibrato, etc.

For more information on materials and sensor configurations that may be used with various implementations, as well as software and devices that may be controlled, please refer to U.S. patent application Ser. No. 12/904,657 entitled Foot-Operated Controller filed on Oct. 14, 2010, the entire disclosure of which is incorporated herein by reference for all purposes.

At least some implementations include an array of LEDs to illuminate the sensor array and employ a scheme for driving the array in a way that allows hundreds of LEDs to be driven off limited current, e.g., the current available from a USB connection. A particular implementation of a controller (e.g., QuNeo 100 of FIG. 1) employs an array of 251 LEDs as shown in FIG. 9 to provide visual feedback to the user. LED array 900 is a PCB layout in which various of the LEDs may be selectively illuminated, e.g., under control of a microprocessor (not shown). One of the design requirements of the depicted implementation is that the controller be safely powered from a USB-2 device host or supply. The electrical specifications for USB-2 include 5V power rails capable of providing up to 500 mA of current for a total of 2.5 watts.

A practical way to control 251 LEDs is to create a 16 by 16 matrix that sources and sinks current for groups of 16 LEDs at a time. This reduces the best case duty cycle or time that the LED is on to $\frac{1}{16}$th. Regular efficiency LEDs are $\frac{1}{3}$rd the cost of high efficiency LEDs and the LED cost is the dominant component of the product's overall component cost. One problem is how to gain maximum brightness without exceeding the 2.5 watts of available USB power using standard efficiency LEDs; particularly given the fact that not all of this 2.5 watts can be dedicated to LED illumination as the QuNeo must perform other functions. Providing the 16 LEDs with a maximum of 30 mA of current at the $\frac{1}{16}$th duty cycle may result in a display that is insufficiently bright for many applications.

Figure 10:
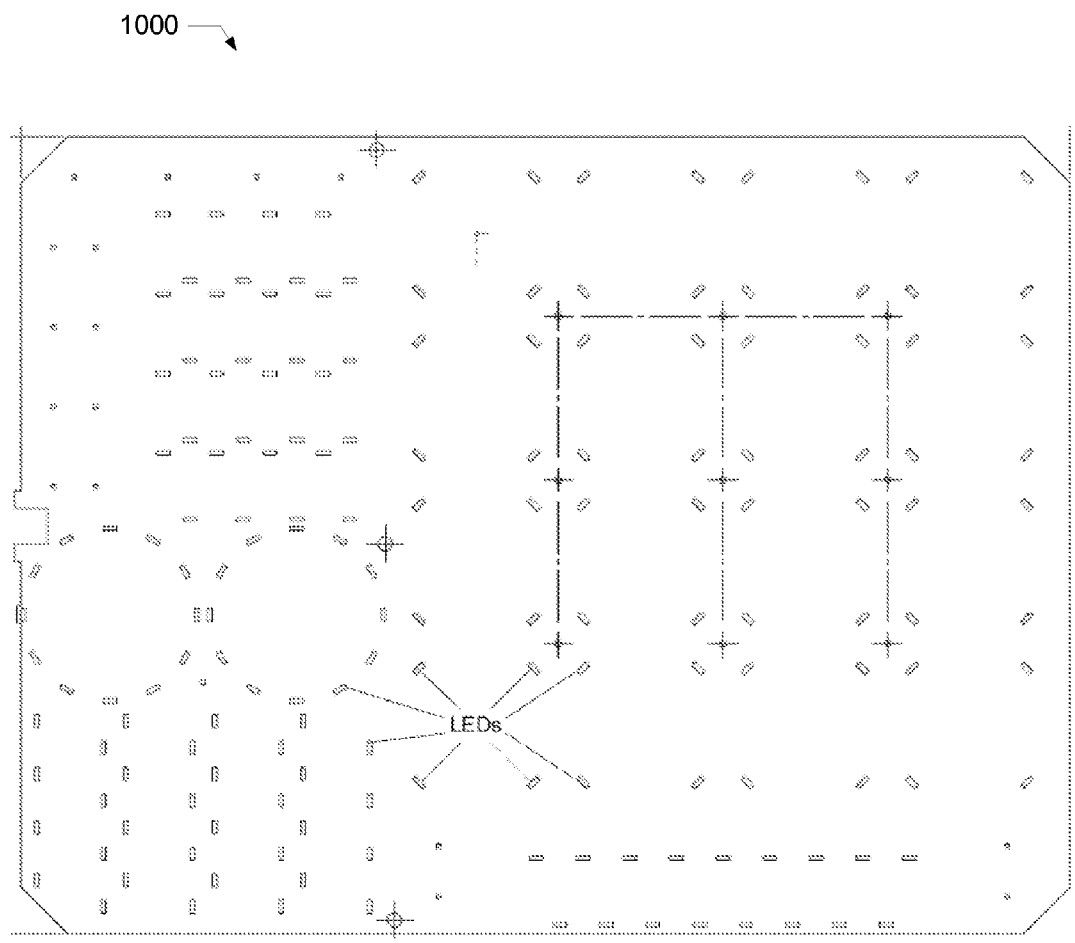
FIG. 10 is a top view of a layout of an array of LEDs for use with a particular implementation of a controller.

While 30 mA is the rated steady state current maximum of regular commercially available LEDs, most can accept a current spike of up to 150 mA for ~100 microseconds. Heat is the limiting factor for steady state current drive, but the LED can be driven brighter for a brief period of time. Therefore, according to a particular class of implementations, a drive circuit is provided for accomplishing the drive current shown in FIG. 10A for each LED within a matrix of source rows and sink columns. One implementation of such a drive circuit is shown in FIG. 10B.

The parallel R and C associated with each LED (e.g., R1 and C1 associated with LED1) provides a brief near DC path to ground creating a limited current spike for each of the LEDs when switched on from an off state. As the duration of the spike is limited by the charge time of the capacitor, no other supervisory or switching circuitry is required, no increase in processor overhead is created, and component cost is minimal. This design not only increases the brightness of the LEDs, it also allows LED refresh cycles to be much shorter than they would otherwise have to be in order to create the desired level of brightness. This possibility of fast refresh rates allows opportunities for more sophisticated display techniques (such as dimming and color-mixing) that are normally only possible with a costly and component-heavy design.

According to a particular implementation, the default refresh rate for a 16×16 LED matrix is ~1000 Hz. By skipping refresh opportunities, the LEDs may be dimmed in a controllable manner. 1000 Hz also allows 16 levels of brightness as well as Off, with no discernible flickering perceived even at low brightness levels. This feature allows the device to respond to a wide range of inputs with a complex and nuanced visual display without exceeding current limit requirements or adding significantly to the cost of the controller.

As is well known, there are two dominant switch or pad layouts used in the conventional musical controller world. One is a 4×4 array of drum pads in which sixteen different drum sounds are mapped 1:1 to the sixteen pads. Hitting a pad causes the corresponding drum sound to be produced. Another popular controller uses an array of 8×8 switches that can be configured, for example, to trigger corresponding audio files, or to determine which one of 8 beats of a rhythm is generated (horizontal pads) for each of 8 different instruments (vertical pads).

Figure 11A:
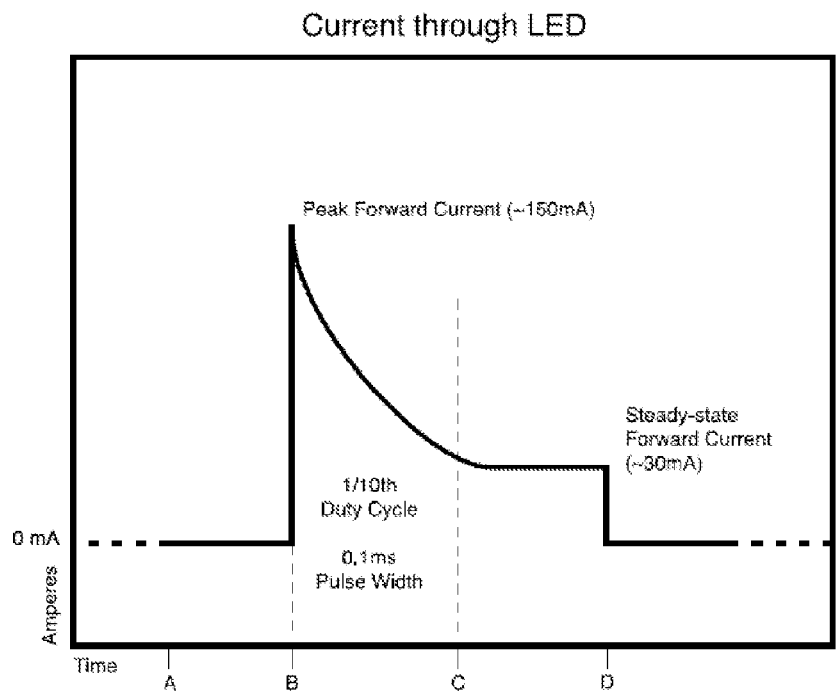
FIGS. 11A and 11B illustrate a drive current and a drive circuit for driving LEDs associated with a particular implementation of a controller.
Figure 11B:
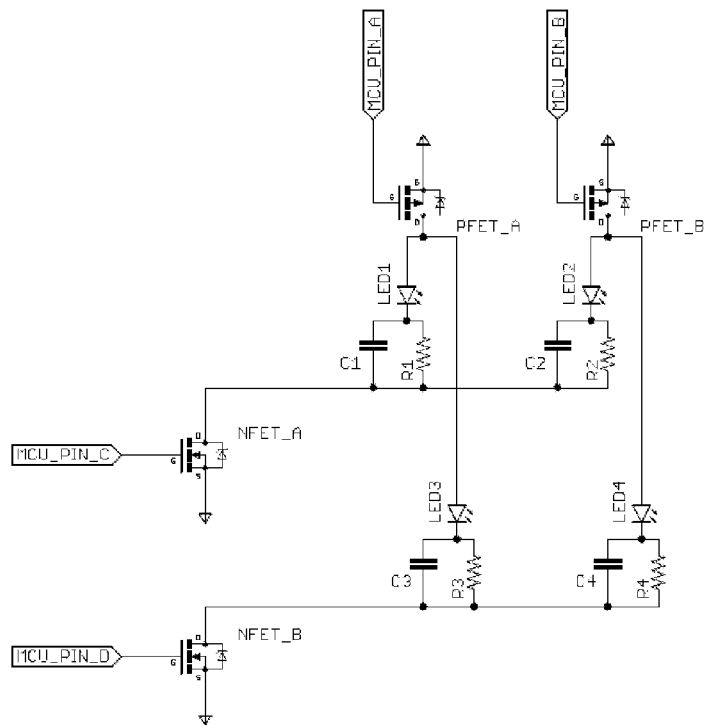

According to a particular class of implementations and as illustrated in FIG. 11, an array of sixteen 4-quadrant QuNeo sensors may be configured to operate as either a 4×4 sensor array (e.g., array 1102) or an 8×8 sensor array (e.g., array 1104), thus combining the functionality of both types of conventional controllers in a single device. That is, because each of the 16 pads of a particular QuNeo implementation may behave as a positional sensor and includes bicolor LEDs in each corner, each pad can operate as a single sensor, e.g., as a drum-style trigger, or as a set of four pressure-sensitive switches, thus providing the utility of both a 4×4 array and an 8×8 array. The LEDs may be selectively illuminated to provide visual feedback to the user as to the current configuration.

According to some implementations, QuNeo may be configured to power up with presets that emulate the functionality of popular drum pad and grid controllers. For example, in the traditional drum pad mode, QuNeo may behave like an Akai MPD/MPC pad controller configured for dynamic electronic drumming and pad based sequencing. For example, QuNeo may be set up similar to a standard drum pad controller, with four sets of notes from C2 to E7. An appropriate velocity value may be associated with each note. 16 notes may be playable (1 per pad), e.g., starting from the bottom left and ascending chromatically to the right and toward the top.

Alternatively, as a grid controller, the QuNeo may emulate popular 8×8 grid based controllers like the Monome and Novation's Launchpad. Monome style sequencing and sample manipulation is readily emulated, with the added bonus of pressure output for each of the 64 steps. In another example, clip launching in Ableton Live is also easily supported while operating as a grid controller, with 64 possible clips per bank. Multi color LEDs, also in an 8×8 grid, may act as indicators for beats and playing/recording.

According to a particular class of implementations, QuNeo may be configured to work with a wide variety of third-party software and/or devices. This versatility is enabled through the installation of ancillary code into the third-party software to enable the mapping of QuNeo's high-density control information to existing music applications, e.g., synthesizers, DJ applications, recording applications, etc.

Such implementations of QuNeo have a variety of associated templates that allow QuNeo to integrate and work with the various third-party software. These templates facilitate installation of Python script code into the third-party software that maps the QuNeo control information to the inputs recognized by the interface stack of the third-party software. When the QuNeo software is activated (e.g., on a user's PC as downloaded from the web), the user is presented with a list of third-party software. When the user selects one or more options with which he wants the QuNeo to work, the installer finds the selected software and installs the necessary scripts. Corresponding manuals may also be loaded which explain how to use the QuNeo to control the selected software.

Figure 12:
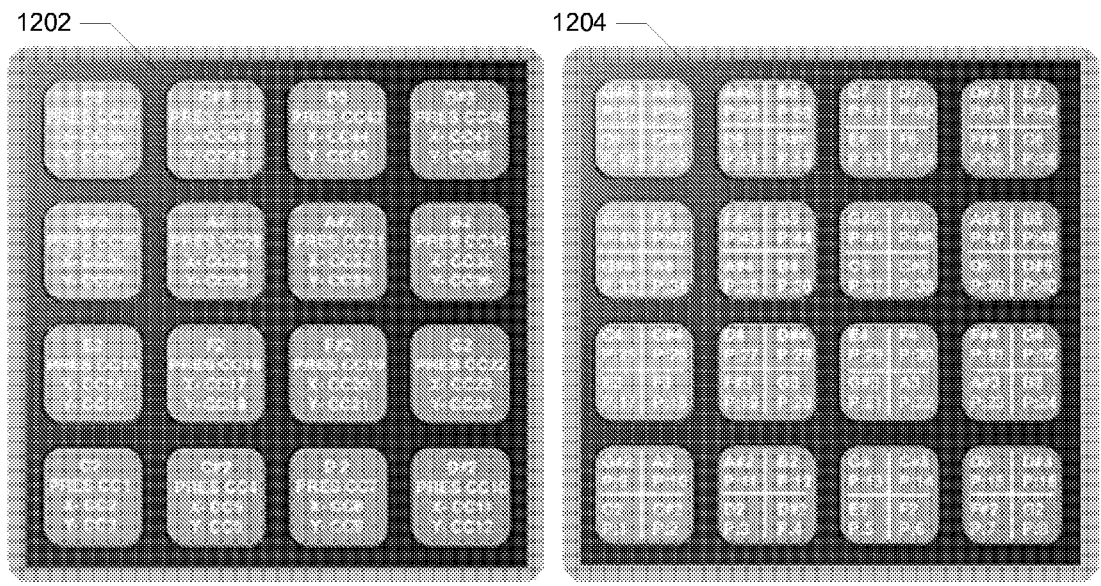
FIG. 12 shows two different configurations of an array of control pads of a particular implementation of a controller.

QuNeo has the potential to interface with many different software applications since it is a class-compliant MIDI device with control information mappings to complement many of the most popular pieces of software. When the user installs QuNeo software (e.g., downloaded to his PC from the web), the user is prompted to select from among the available software templates as shown in screenshot 1200 of FIG. 12. Each option on the list has an associated group of files that save the user setup time, providing an easy "out-of-box" experience for the user in connecting QuNeo with their favorite software application.

For example, if the user selects the Ableton Live template, an Ableton Live example file is put into the user's install directory along with an automatically installed QuNeo Editor and associated documentation. The example file includes sounds the user can try out to illustrate the way in which QuNeo is initially set up to control the Ableton Live software. Selection of the Ableton Live template also results in installation of a group of remote mapping files. These mapping files control which of the application's functions are triggered when data are received from QuNeo. For example, when a certain button on QuNeo is pressed, the application's play button is triggered). In the case of Ableton Live, the mapping files are Python scripts. However, it should be noted that the mapping file format may vary from application to application.

Figure 13:
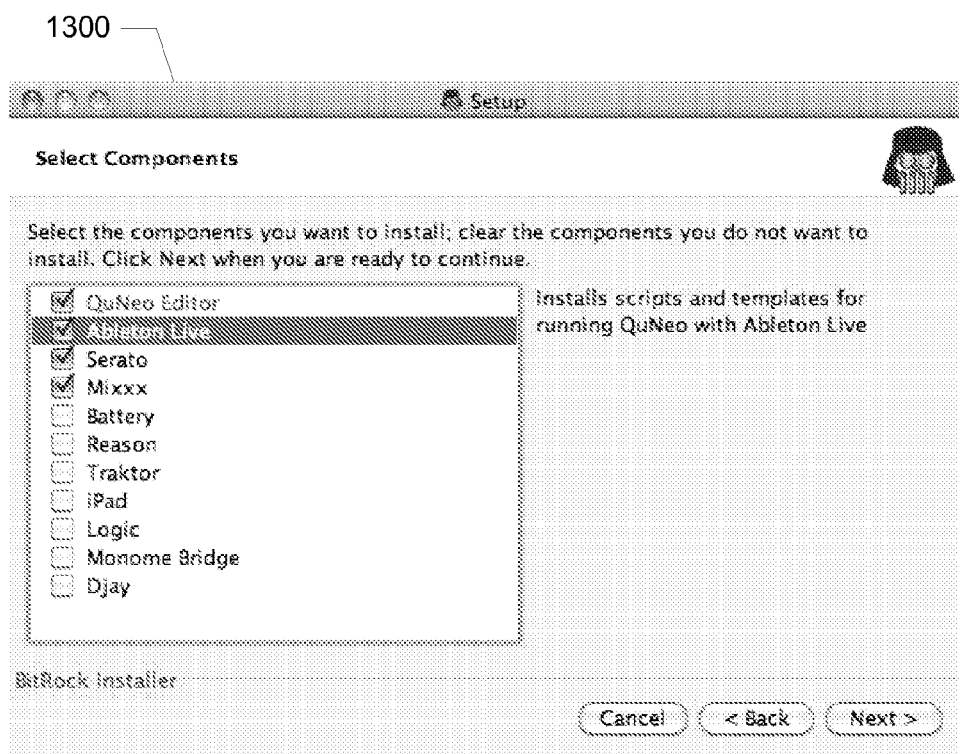

The installer places the remote mapping files in a location on the user's computer where the corresponding application can find them and interact with them accordingly. The location may be a default, in the user's Applications folder on a Mac. Alternatively, this may be accomplished by asking the user to browse to a particular directory—usually to the location of the selected application itself—as shown in screenshot 1300 of FIG. 13.

Figure 14:
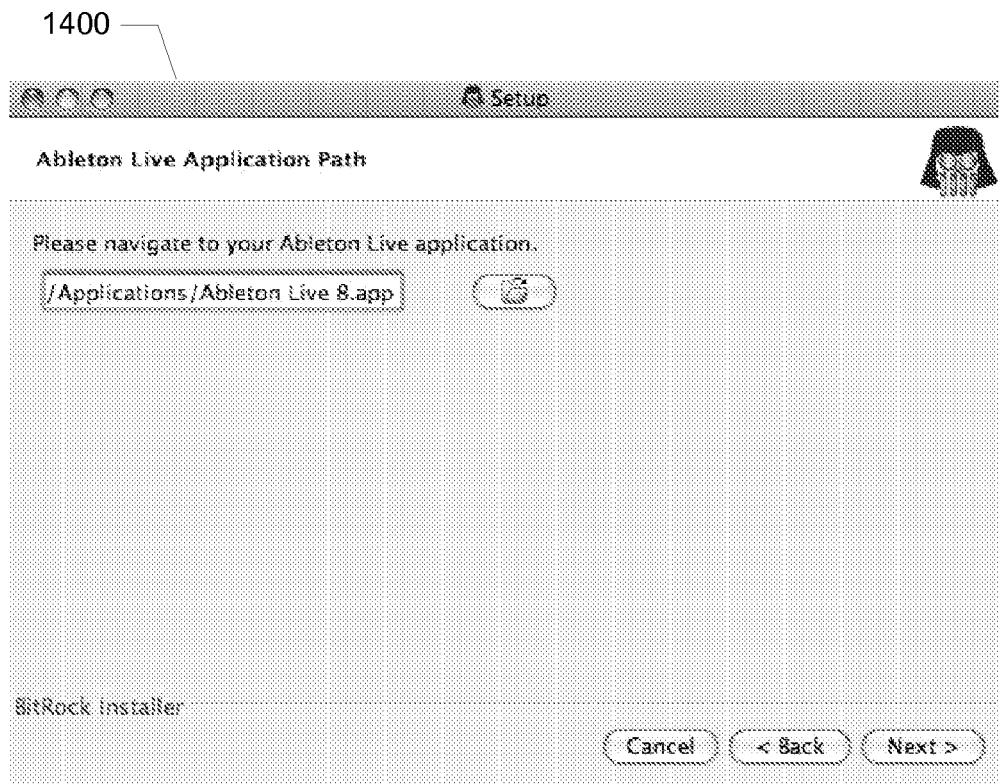

There is some error checking in place to make sure the user doesn't accidentally select the wrong location, and then the remote mapping files are copied into the selected location. In the case of Ableton Live, the Python scripts go into a folder within the application where other supported controller scripts typically exist (e.g., as shown in screenshot 1400 of FIG. 14). In this way, the application will then recognize QuNeo as a supported control surface when it is next launched.

Figure 15:
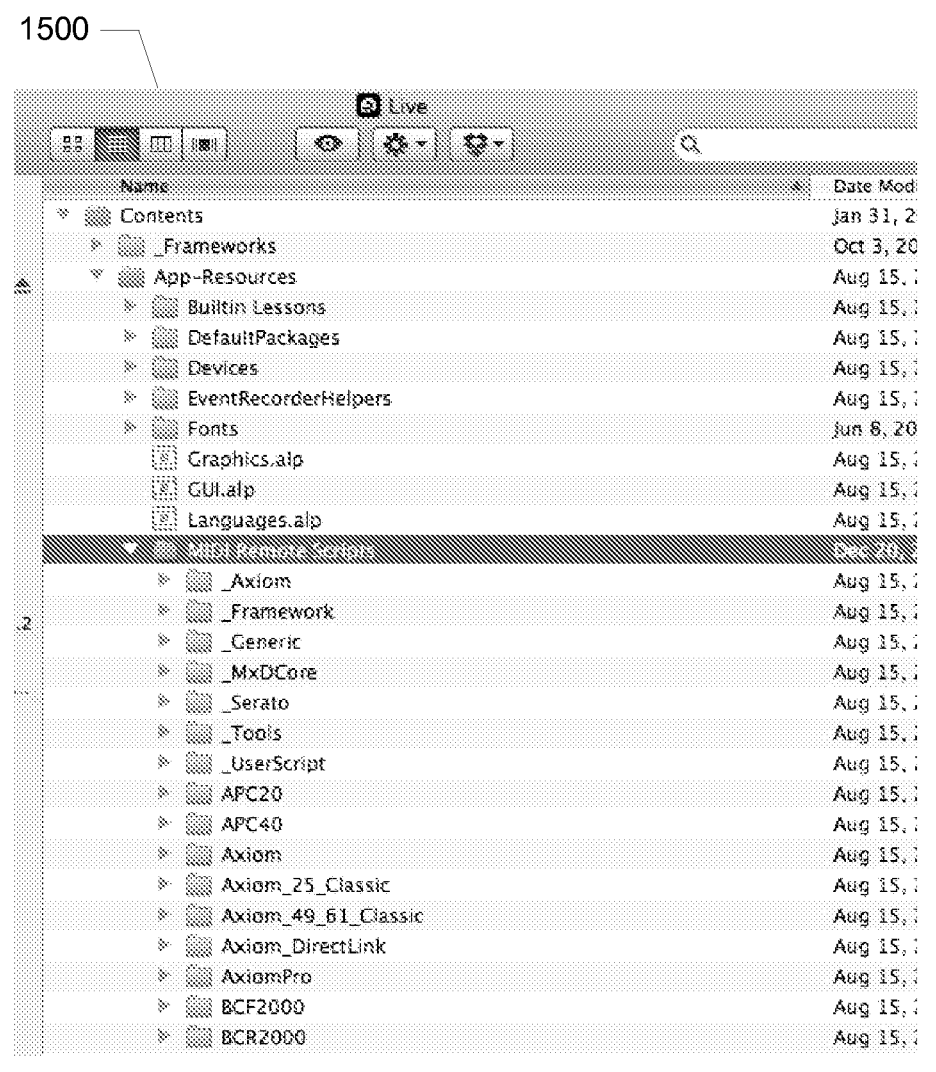

A copy of the remote mapping files may also be placed in the install directory in case there is an error during installation, if the user wants to manually add the files to a different version of Ableton Live, or in case they are just curious to look at them. The install directory might end up looking like screenshot 1500 of FIG. 15. As shown, there is a folder within the Software Templates folder for each application the user selects. The folder Ableton Live 1.1 contains the folder Installation Files (which holds the extra copy of the Ableton Live remote mapping files), the Quickstart guides documenting how to use the Ableton Live template, and the example file containing sounds for the user to try out ("QuNeoDemo Project").

As is well known, Ableton Live is for electronic music performance and composition. Another example of third-party software that may be controlled using QuNeo is Mixxx—a free DJ program. The Mixxx template allows users to play the rotary sensors like turntables, create loops using the pads, and, in turn Mixxx control information is used to control the QuNeo LEDs. So, with a single purchase, i.e., the QuNeo, the user has everything he needs to start DJ-ing right away. Mixxx uses a different file format to keep track of its commands. To recognize QuNeo as a controller Mixxx needs two files with very particular names placed into its MIDI folder called "KMI QuNeo.midi.xml" and "KMI-QuNeo-scripts.js." When Mixxx sees these two files it creates an option in its menu of MIDI controllers called "KMI QuNeo." When the user selects this option, QuNeo is configured to control the Mixxx application in the way defined by these two files.

Figure 16:
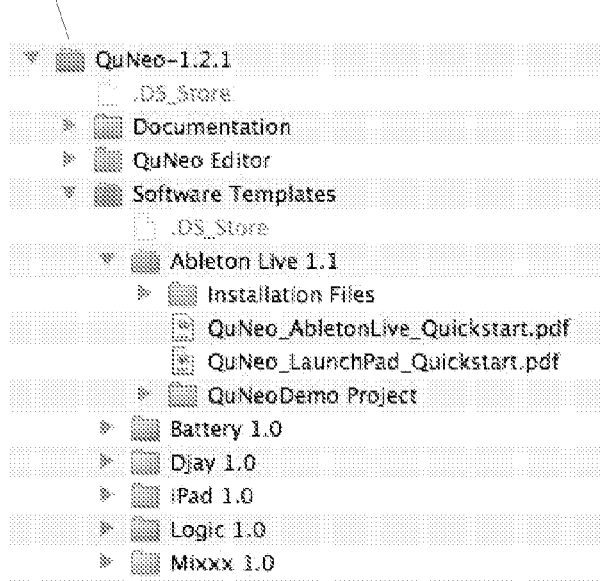
Figure 17:
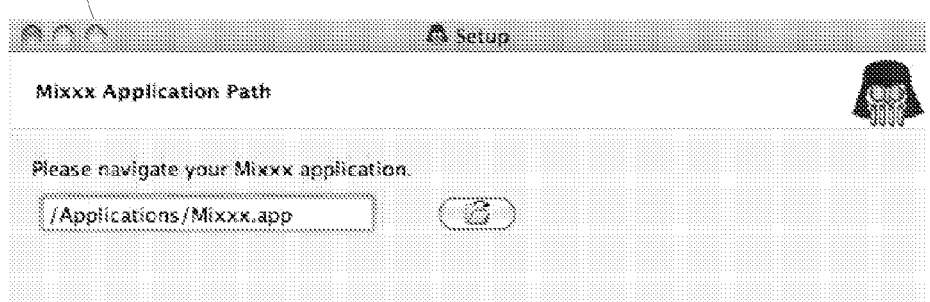

If the user decides to install the Mixxx template in screenshot 1200, he is again prompted to navigate to the location of his Mixxx application (as illustrated in screenshot 1600 of FIG. 16) to find the location where these two remote mapping files should be stored. Finally, a folder called Mixxx 1.0 is created inside of the user's Software Templates folder (see screenshot 1500) holding a Quickstart guide to explain how to use the template, and a copy of the two Remote Files just in case the user needs to move them in manually, or edit them in some way. In this way, the user can quickly configure his QuNeo to control his existing software.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, reference to particular protocols herein are merely by way of example. Suitable alternatives known to those of skill in the art may be employed without departing from the scope of the invention.

While the invention has been particularly shown and described with reference to specific embodiments thereof, it will be understood by those skilled in the art that changes in the form and details of the disclosed embodiments may be made without departing from the spirit or scope of the invention. For example, implementation have been described herein in which sensors are implemented in which piezoresistive material is brought into contact with conductive elements on an underlying PCB. However, it should be noted that implementations are contemplated in which the elements on the PCB themselves include or are constructed with piezoresistive material, and the overlying material that contacts the PCB elements may be conductive and/or piezoresistive.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A sensor configured to generate sensor signals representing one or more touch events on a surface associated with the sensor, the sensor comprising a one-dimensional array of conductive traces, first ones of the conductive traces being connected to a voltage reference, and second ones of the conductive traces being configured to receive sequential drive signals, at least some of the first and second conductive traces being connected to one or more resistive elements, the sensor also comprising a piezoresistive material adjacent the first and second conductive traces, wherein the piezoresistive material, the first and second conductive traces, and the one or more resistive elements are configured to form voltage dividers, the voltage dividers being configured to generate the sensor signals responsive to the one or more touch events when the second conductive traces are driven by the sequential drive signals, the sensor also comprising sensor circuitry configured drive the second conductive traces with the sequential drive signals, and to generate control information from the sensor signals, the control information including a representation of one-dimensional motion of an object in contact with the surface of the sensor.

2. The sensor of claim 1, wherein the piezoresistive material comprises one of germanium, polycrystalline silicon, amorphous silicon, fabric, or single crystal silicon.

3. The sensor of claim 1, wherein the sensor signals represent one or more corresponding locations of the one or more touch events on the surface of the sensor.

4. The sensor of claim 1, wherein the one or more touch events comprise multiple and simultaneous touch events, and wherein the sensor signals represent corresponding locations of the multiple and simultaneous touch events.

5. The sensor of claim 1, wherein the sensor signals represent pressure of the one or more touch events on the surface of the sensor.

6. The sensor of claim 5, wherein the one or more touch events comprise multiple and simultaneous touch events, and wherein the sensor signals also represent corresponding locations of the multiple and simultaneous touch events on the surface of the sensor.

7. The sensor of claim 1, wherein the array of the first and second conductive traces is an alternating arrangement of the first and second conductive traces.

8. A control system comprising at least one instance of the sensor of claim 1, the sensor circuitry also being configured to map the control information to one or more control functions.

9. The control system of claim 8, wherein the sensor signals represent pressure of the one or more touch events on the surface of the sensor, wherein a first one of the touch events corresponds to more than one of the voltage dividers formed from the piezoresistive material and more than one pair of the first and second conductive traces, and wherein the sensor circuitry is configured to generate the control information to represent a first location of the first touch event as corresponding to one of the pairs of the first and second conductive traces with reference to the representation of the pressure of the first touch event in the sensor signals.

10. The control system of claim 8, wherein the one or more touch events comprise multiple and simultaneous touch events, and wherein the sensor signals represent pressure of the multiple and simultaneous touch events on the surface of the sensor, wherein the sensor signals also represent corresponding locations of the multiple and simultaneous touch events on the surface of the sensor, and wherein the sensor circuitry is configured to generate the control information to represent the pressure associated with each of the multiple and simultaneous touch events.

11. The control system of claim 8, wherein the sensor signals represent one or more corresponding locations and pressure of the one or more touch events on the surface of the sensor, and wherein the sensor circuitry is configured to map the control information to multiple control functions corresponding to different gestures represented by the one or more touch events.

12. The sensor of claim 1, wherein the one or more touch events comprise multiple and simultaneous touch events, and wherein the sensor circuitry is configured to generate the control information to include a representation of each of the touch events.

13. The sensor of claim 1, wherein the sensor circuitry is configured to generate the control information to include a representation of pressure for each of the one or more touch events.

14. The sensor of claim 1, wherein the sensor circuitry is configured to generate the control information to include a representation of one or more locations of the one or more touch events on the surface of the sensor.

15. The sensor of claim 14, wherein the sensor circuitry is configured to generate the control information to include a representation of the one or more locations with reference to contributions to the sensor signals from more than one pair of the first and second conductive traces.

16. The sensor of claim 1, wherein the sensor circuitry is configured to generate the control information to include a representation of pressure and/or a location of a first one of the one or more touch events, and changes in the pressure and/or the location of the first touch event.

17. The sensor of claim 16, wherein the representation of the pressure and/or the location of the first touch event corresponds to a quantized state, and wherein the representation of the changes in the pressure and/or the location of the first touch event correspond to modulations around the quantized state.

18. A sensor configured to generate sensor signals representing one or more touch events on a surface associated with the sensor, the sensor comprising:
    an arrangement of wedge-shaped conductive traces, first ones of the conductive traces being connected to a voltage reference, and second ones of the conductive traces being configured to receive sequential drive signals, at least some of the first and second conductive traces being connected to one or more resistive elements;

piezoresistive material adjacent the first and second conductive traces, wherein the piezoresistive material, the first and second conductive traces, and the one or more resistive elements are configured to form voltage dividers, the voltage dividers being configured to generate the sensor signals responsive to the one or more touch events when the second conductive traces are driven by the sequential drive signals, and wherein the arrangement of the first and second conductive traces is an alternating circular arrangement of the first and second conductive traces; and sensor circuitry configured drive the second conductive traces with the sequential drive signals, to generate control information from the sensor signals, wherein the control information represents a distance from a center of the circular arrangement based on contributions from more than one of the conductive traces represented in the sensor signals.

19. The sensor of claim 18, wherein piezoresistive material comprises one of germanium, polycrystalline silicon, amorphous silicon, fabric, or single crystal silicon.

20. The sensor of claim 18, wherein the sensor signals represent one or more corresponding locations of the one or more touch events on the surface of the sensor.

21. The sensor of claim 20, wherein the one or more touch events correspond to an object in contact with the surface of the sensor, and wherein the sensor signals also represent movement of the object across the surface of the sensor.

22. The sensor of claim 21, wherein the sensor signals also represent pressure of the one or more touch events on the surface of the sensor.

23. The sensor of claim 18, wherein the one or more touch events comprise multiple and simultaneous touch events, and wherein the sensor signals represent corresponding locations of the multiple and simultaneous touch events.

24. The sensor of claim 18, wherein the sensor signals represent pressure of the one or more touch events on the surface of the sensor.

25. The sensor of claim 24, wherein the one or more touch events comprise multiple and simultaneous touch events, and wherein the sensor signals also represent corresponding locations of the multiple and simultaneous touch events on the surface of the sensor.

26. A control system comprising at least one instance of the sensor of claim 18, the sensor circuitry also being configured to map the control information to one or more control functions.

27. The control system of claim 26, wherein the sensor signals represent pressure of the one or more touch events on the surface of the sensor, wherein a first one of the touch events corresponds to more than one of the voltage dividers formed from the piezoresistive material and more than one pair of the first and second conductive traces, and wherein the sensor circuitry is configured to generate the control information to represent a first location of the first touch event as corresponding to one of the pairs of the first and second conductive traces with reference to the representation of the pressure of the first touch event in the sensor signals.

28. The control system of claim 26, wherein the one or more touch events comprise multiple and simultaneous touch events, wherein the sensor signals represent pressure of the multiple and simultaneous touch events on the surface of the sensor, wherein the sensor signals also represent corresponding locations of the multiple and simultaneous touch events on the surface of the sensor, and wherein the sensor circuitry is configured to generate the control information to represent the pressure associated with each of the multiple and simultaneous touch events.

29. The control system of claim 26, wherein the sensor signals represent one or more corresponding locations and one or more pressures of the one or more touch events on the surface of the sensor, and wherein the sensor circuitry is configured to map the control information to multiple control functions corresponding to different gestures represented by the one or more touch events.

30. The sensor of claim 18, wherein the one or more touch events comprise multiple and simultaneous touch events, and wherein the sensor circuitry is configured to generate the control information to include a representation of each of the touch events.

31. The sensor of claim 18, wherein the sensor circuitry is configured to generate the control information to include a representation of pressure for each of the one or more touch events.

32. The sensor of claim 18, wherein the sensor circuitry is configured to generate the control information to include a representation of one or more locations of the one or more touch events on the surface of the sensor.

33. The sensor of claim 32, wherein the sensor circuitry is configured to generate the control information to include a representation of the one or more locations with reference to contributions to the sensor signals from more than one pair of the first and second conductive traces.

34. The sensor of claim 18, wherein the sensor circuitry is configured to generate the control information to include a representation of pressure and/or a location of a first one of the one or more touch events, and changes in the pressure and/or the location of the first touch event.

35. The sensor of claim 34, wherein the representation of the pressure and/or the location of the first touch event corresponds to a quantized state, and wherein the representation of the changes in the pressure and/or the location of the first touch event correspond to modulations around the quantized state.

* * * * *